Patented Feb. 24, 1948

2,436,433

UNITED STATES PATENT OFFICE 2,436,433

PROCESS FOR COATING POLYVINYL ALCOHOL FILM

Walter John Jebens, Plainfield, N. J., assignor to E. I. du Pont de Nemours & Company, Wilmington, Del., a corporation of Delaware No Drawing. Application April 23, 1943, Serial No. 484,309

6 Claims. (Cl. 117—138.8)

This invention relates to sheeting useful as wrapping or packaging material produced from water-soluble polyvinyl alcohol. More specifically, it relates to polyvinyl alcohol sheet material coated with a polyvinyl acetal resin.

Because of their strength, toughness, tear-resistance and durability sheets or films of polyvinyl alcohol are used to some extent as wrapping or packaging material. Their utility in this and in other fields has, however, been somewhat restricted by reason of the well known fact that polyvinyl alcohol structures are highly sensitive to water and even to moisture in the air.

A number of methods have been proposed for reducing the water-sensitivity of the polyvinyl alcohol without at the same time adversely affecting its strength and toughness; for example, polyvinyl alcohol structures have been treated with titanium sulfate, followed by an after-treatment in a caustic solution; copper salts have been added to the polyvinyl alcohol casting or spinning dope and structures produced therefrom have been treated in a caustic solution; and polyvinyl alcohol structures have also been reacted with strong organic acids, such as formic acid and chloroacetic acid. It has further been proposed to reduce the water-sensitivity of the surface of polyvinyl alcohol structures by reacting the surface with an aldehyde or a cyclic ketone in the presence of a catalyst. It has been suggested further to coat polyvinyl alcohol film with moistureproof coating compositions such as described in Charch and Prindle U. S. Patent No. 1,737,187.

In most of the above treatments, as a practical matter, it is difficult to restrict the reaction to the surface of the polyvinyl alcohol film or structure. The reaction of the aldehyde or cyclic ketone with the surface of the polyvinyl alcohol is also unsatisfactory because it does not give a product having satisfactory water resistance. Polyvinyl alcohol films and structures coated with moistureproof coating compositions of the type previously employed have not generally proved satisfactory since the coating does not adhere well to the base sheet.

It is, therefore, an object of the present invention to produce a polyvinyl alcohol sheet or film having a reduced sensitivity to water while retaining the characteristic strength, toughness and durability of polyvinyl alcohol.

Another object of the present invention is to provide a polyvinyl alcohol sheet or film having a well-anchored water-insoluble coating.

A still further object of this invention is to coat polyvinyl alcohol film with a polyvinyl acetal resin and to anchor the coating to the base sheet.

These and other objects will more clearly appear hereinafter.

These objects are realized by the present invention which comprises coating a polyvinyl alcohol film with a solution of a water-insoluble polyvinyl acetal resin, an aliphatic aldehyde containing not more than four carbon atoms, and an acid catalyst, and thereafter heating the film for a sufficient period of time to cause the aldehyde to react with the polyvinyl alcohol film whereby to form in situ a polyvinyl acetal product penetrating the surface of the film and to drive off the solvent. The coated film is then washed to remove the acid catalyst and any aldehyde which may not have reacted. The film is dried and is ready for use.

In general, the base sheet or film may be produced from any polyvinyl alcohol which is soluble in water. Included in this grouping are the products of the incomplete saponification of polyvinyl acetate and related esters to polyvinyl alcohols which products contain as much as 35% of unsaponified ester groups. Included also are polyvinyl alcohols containing sufficient hydroxyl groups to confer water-solubility in which part of the alcohol groups have been reacted with aldehydes, such as formaldehyde, acetaldehyde, propionaldehyde and butyraldehyde, to form acetal groups. A practically completely saponified product can be reacted with butyraldehyde to produce a butyral having up to 9% substitution without loss of water-solubility. If acetaldehyde is used, up to 50% of the hydroxyl groups may be reacted without producing a water-insoluble product. Water-soluble polyvinyl alcohols the apparent molecular weights of which are in the range of 15,000 to 19,000 are preferred for sheet wrapping and protective covering material. Products in the range of 8,000 to 22,000 can, however, be cast and used satisfactorily.

The polyvinyl alcohol may be produced in accordance with any method known to the art, for example, by saponifying with a 1% solution of hydrochloric acid in methyl alcohol, a polymeric vinyl acetate in turn prepared, for example, by polymerizing monomeric vinyl acetate by means of 0.5% of sodium perborate and 5% acetic anhydride.

The polyvinyl alcohol film may contain a softener, such as glycerol, ethanol formamide, methanol formamide, etc. amounting to as much as 40% by weight of the polyvinyl alcohol. Preferably, however, a softener content from 5% to 20% is used.

The polyvinyl acetal resins suitable for use as coatings in accordance with the present invention are those produced by reacting aliphatic aldehydes containing not more than 4 carbon atoms with sufficient hydroxyl groups of polyvinyl alcohol to produce a water-insoluble product. Of these resins, it is preferred to use the polyvinyl butyral resin. Polyvinyl butyral resins produced by reacting at least 50% of the available hydroxyl groups of polyvinyl alcohol with butyraldehyde may be employed. However, for superior results, it is preferred that at least 74% of the available hydroxyl groups of the polyvinyl alcohol be reacted with butyraldehyde. The preparation and properties of polyvinyl acetals are disclosed in U. S. Patents Nos. 2,035,939 and 2,036,092 (Morrison).

The aldehydes suitable for use in accordance with the present invention are aliphatic aldehydes containing not more than four carbon atoms. Included in this group are formaldehyde, acetaldehyde, n-propionaldehyde, isopropionaldehyde, n-butyraldehyde and isobutyraldehyde. Exceptionally good results have been obtained using n-butyraldehyde and this compound is preferred. When it is desired to produce a formal, it is preferred to use trioxymethylene rather than the volatile formaldehyde. If desired, a mixture of aldehydes may be used.

The concentration of aldehyde in the coating composition may vary from 10% to 50%, by weight, the preferred range of concentration being from 30% to 40%, by weight, of the liquid coating composition.

The acid catalysts to be used in accordance with this invention include any of the strong inorganic or organic acids, such as toluene sulfonic acids, sulfuric acid, hydrochloric acid, maleic acid, etc.

The solvent used in dissolving the polyvinyl acetal resin may consist of alcohols, such as methanol, ethanol, n-propanol, isopropanol, n-butanol, isobutanol and mixtures thereof; or mixtures of these alchols with aromatic hydrocarbon solvents, such as benzol, toluol, etc. When polyvinyl formaldehyde resin is used, an alcohol-aromatic hydrocarbon mixture is required.

The reaction of the aldehyde with the surface of the polyvinyl alcohol film and the drying of the coating is preferably accomplished by continuously leading the coated film through a heated chamber. It has been found that the temperature and time for drying this film is sufficient to cause the surface reaction of the polyvinyl alcohol with the aldehyde. The drying and the reaction may be completed by subjecting the film to a temperature of 100° C. for one minute. Temperatures ranging from 60° C. to 110° C. with a corresponding change in time may also be used.

The excess aldehyde and catalyst are removed by washing with water, a water-methyl acetate mixture, methyl acetate or other solution in which said materials are soluble but in which the polyvinyl butyral resin is insoluble.

The amount of coating applied to the polyvinyl alcohol film may be such that the final dried film contains on each side thereof from 0.5 gram to 6 grams of coating per square meter of base sheet. Preferably, however, the amount of coating ranges from 1 gram to 3 grams per square meter on each side of the film.

The polyvinyl acetal resin coating may be applied to one or both sides of the polyvinyl alcohol film by any of the known processes such as dipping, brushing, spraying and the like.

The invention is further described in the following detailed examples wherein percentage compositions are by weight unless otherwise indicated.

Example I

A water-soluble polyvinyl alcohol film is passed through a solution of the following composition:

| | Per cent |
|---|---|
| Polyvinyl butyral resin (85% acetalized) | 7.4 |
| Butyraldehyde | 35.6 |
| Ethanol | 56.6 |
| Paratoluene sulfonic acid | 0.4 |

The amount of coating on the film is regulated by means of doctor knives and the treated film subjected to a temperature of 100° C. for one minute. The coated film is passed through a wash water bath to remove the catalyst and the excess aldehyde and is again dried. The polyvinyl alcohol film so treated has a final dried coating on each side thereof amounting to 1.5 grams per square meter of film. The coating is extremely well anchored to the base sheet under both wet and dry conditions. The anchorage is found to be far superior to that obtained when using a coating composition containing polyvinyl butyral resin and no aldehyde or acid catalyst.

The term "anchorage," as used herein, refers to the adhesion of the dried polyvinyl acetal-type resin coating to the base sheet of polyvinyl alcohol. As means for testing the anchorage of the coating, the following tests are made and the results indicated. A strip of Scotch tape pressed onto the surface of the unanchored coating will take the coating with it when the tape is stripped from the polyvinyl alcohol film. The same test on the anchored coating shows no evidence of the coating's being removed from the base sheet. A polyvinyl alcohol film having a polyvinyl butyral coating thereon which is not anchored, when placed in water, will separate from the coating usually within an hour. The polyvinyl butyral resin coating anchored to the polyvinyl alcohol film in accordance with the present invention will still be well anchored after immersion in water for 12 hours.

Example II

A water-soluble polyvinyl alcohol film containing 15% glycerin is passed through a solution having the following composition:

| | Percent |
|---|---|
| Polyvinyl butyral resin (75% acetalized) | 8.0 |
| Isobutyraldehyde | 35.0 |
| Methanol | 56.7 |
| Sulfuric acid | 0.3 | with the amount of coating remaining on the film being regulated by means of doctor knives. The treated film is then passed through a chamber maintained at 100° C., the film remaining in the chamber for one minute. The coated film is then washed in a water-methyl acetate bath to remove the acid and the excess aldehyde and is finally dried. Results similar to those described in Example I are obtained.

Example III

A water-soluble polyvinyl alcohol film containing no softener is passed through a solution having the composition:

|  | Percent |
|---|---|
| Polyvinyl butyral resin (85% acetalized) | 6.6 |
| Butyraldehyde | 32.5 |
| Methanol | 51.2 |
| Glycolic acid | 4.7 |
| Glycerol | 4.7 |
| Toluene sulfonic acid | 0.3 | and the excess coating solution removed by means of doctor knives. The film is dried at 100° C., washed in water to remove the acid catalyst and the excess aldehyde, and finally dried again. The resulting coated film is found to have a very much reduced sensitivity to water and the coating is strongly anchored to the base sheet.

The glycerol present in the coating composition passes into the polyvinyl alcohol sheet where it remains as a softener.

Example IV

A polyvinyl alcohol film containing 18% ethanol formamide is passed through a solution having the composition:

|  | Percent |
|---|---|
| Polyvinyl butyral resin (60% acetalized) | 8.0 |
| Propionaldehyde | 35.0 |
| Methanol | 56.6 |
| Hydrochloric acid | 0.4 | and the amount of coating permitted to remain on the film regulated by means of doctor knives. The freshly coated polyvinyl alcohol film is then passed through a chamber heated to a temperature of 85° C., said film being held in the chamber for a period of two minutes. The dried coated film is then washed in a water bath to remove the acid catalyst and the excess aldehyde, and dried. Results similar to those described in Example I were obtained.

Example V

A polyvinyl alcohol film containing 18% ethanol formamide is passed through a solution having the composition:

|  | Percent |
|---|---|
| Polyvinyl propional resin (80% acetalized) | 8.0 |
| Propionaldehyde | 35.0 |
| Methanol | 56.6 |
| Hydrochloric acid | 0.4 | and the amount of coating permitted to remain on the film regulated by means of doctor knives. The freshly coated polyvinyl alcohol film is then passed through a chamber heated to a temperature of 85° C., said film being held in the chamber for a period of two minutes. The dried, coated film is then washed in a water bath to remove the acid catalyst and the excess aldehyde, and dried. Results similar to those described in Example I were obtained.

The invention has been described above with respect to the anchoring of a polyvinyl acetal resin coating to a polyvinyl alcohol film. It is to be understood, however, that the coating composition may be used as a laminating adhesive for two sheets of polyvinyl alcohol film. The films will be strongly bonded together and will not separate in the presence of water or moisture in the air.

The resulting product is easily heat-sealable. The strength, toughness and durability of the polyvinyl alcohol film are retained in the final product and, by the process of the present invention, the water-sensitivity of the surface of the film is markedly reduced by the strongly anchored coating.

The sheet film produced in accordance with the present invention may be used as a wrapping material where uncoated polyvinyl alcohol film has been used in the past and in some other applications where the water-sensitivity of the polyvinyl alcohol film has been an objection. Bags may be formed of this material for the packaging of coffee and other substances. Closet accessories, such as garment covers, may be made of this material. Metal objects and hardware in general which are subject to oxidation and tarnishing may be wrapped in this wrapping material. The sheet material may also be used as a liner for containers for book covers, machine covers, etc.

As many apparently widely different embodiments of this invention may be made without departing from the spirit and scope thereof, it is to be understood that this invention is not limited to the specific embodiments thereof except as defined in the appended claims.

I claim:

1. The process which comprises coating a water-soluble polyvinyl alcohol film or sheet with a solution of a water-insoluble polyvinyl acetal resin as such, an aliphatic aldehyde containing not more than 4 carbon atoms, and an acid catalyst in a volatile organic solvent, and thereafter heating for a length of time sufficient to effect reaction and solvent removal whereby to form a strongly anchored water-insoluble, heat-sealable coating on said polyvinyl alcohol film.

2. The process which comprises coating a water-soluble polyvinyl alcohol film or sheet with a solution of a water-insoluble polyvinyl butyral resin as such, an aliphatic aldehyde containing not more than 4 carbon atoms, and an acid catalyst in a volatile organic solvent, and thereafter heating for a length of time sufficient to effect reaction and solvent removal whereby to form a strongly anchored water-insoluble, heat-sealable coating on said polyvinyl alcohol film.

3. The process which comprises coating a water-soluble polyvinyl alcohol film or sheet with a solution of a water-insoluble polyvinyl butyral resin as such formed by reacting butyraldehyde with at least 74% of the available hydroxyl groups of water-soluble polyvinyl alcohol, an aliphatic aldehyde containing not more than 4 carbon atoms, and an acid catalyst in a volatile organic solvent, and thereafter heating for a length of time sufficient to effect reaction and solvent removal whereby to form a strongly anchored, water-insoluble, heat-sealable coating on said polyvinyl alcohol film.

4. The process which comprises coating film or sheets of a water-soluble polyvinyl alcohol having an apparent molecular weight within the range of 15,000 to 19,000 with a solution of a water-insoluble polyvinyl acetal resin as such, an aliphatic aldehyde containing not more than 4 carbon atoms, and an acid catalyst in a volatile organic solvent, and thereafter heating the coated film at a temperature of 60° to 110° C. for a length of time sufficient to effect reaction and to remove the solvent whereby to form a strongly anchored, water-insoluble, heat-sealable coating on said polyvinyl alcohol film.

5. The process which comprises coating film or sheets of a water-soluble polyvinyl alcohol having an apparent molecular weight within the range of 15,000 to 19,000 with a solution of a water-insoluble polyvinyl butyral resin as such, an aliphatic aldehyde containing not more than 4 carbon atoms, and an acid catalyst in a volatile organic solvent, and thereafter heating the coated film at a temperature of 60° to 110° C. for about one minute whereby to form a strongly anchored, water-insoluble, heat-sealable coating on said polyvinyl alcohol film.

6. The process which comprises coating film or sheets of a water-soluble polyvinyl alcohol having an apparent molecular weight within the range of 15,000 to 19,000 with a solution of a water-insoluble polyvinyl butyral resin as such formed by reacting butyraldehyde with at least 74% of the available hydroxyl groups of water-soluble polyvinyl alcohol, an aliphatic aldehyde containing not more than 4 carbon atoms, and an acid catalyst in a volatile organic solvent, and thereafter heating the coated film at a temperature of 60° to 110° C. for about one minute whereby to form a strongly anchored, water-insoluble, heat-sealable coating on said polyvinyl alcohol film.

WALTER JOHN JEBENS.

REFERENCES CITED

The following references are of record in the file of this patent:

UNITED STATES PATENTS

| Number | Name | Date |
|---|---|---|
| 2,083,628 | Zelger | June 15, 1937 |
| 2,360,477 | Dahle | Oct. 17, 1944 |